(12) United States Patent
Ji et al.

(10) Patent No.: US 7,118,815 B2
(45) Date of Patent: Oct. 10, 2006

(54) METHOD TO IMPROVE COERCIVITY RADIAL PROFILE IN MAGNETIC RECORDING MEDIA AND PRODUCT THEREOF

(75) Inventors: Xiongwei Ji, Singapore (SG); Jianzhong Shi, Singapore (SG); Darren Soonkeong Ng, Singapore (SG); Kakeng Ling, Bukit Batok (SG); Huitong Ng, Singapore (SG); Chinsoon Koh, Singapore (SG); Yuanda Randy Cheng, Phoenix, AZ (US); Steven Hiyoshi Sawaski, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 22 days.

(21) Appl. No.: 10/771,376

(22) Filed: Feb. 5, 2004

(65) Prior Publication Data

US 2005/0175863 A1    Aug. 11, 2005

(51) Int. Cl.
*G11B 5/66* (2006.01)
(52) U.S. Cl. .................................................. 428/827
(58) Field of Classification Search .................. None
See application file for complete search history.

(56) References Cited

U.S. PATENT DOCUMENTS 4,663,009 A * 5/1987 Bloomquist et al. ...... 204/192.2
5,616,218 A   4/1997 Alex
6,808,763 B1 * 10/2004 Hirschmann et al. ........ 428/1.1
2004/0262148 A1 * 12/2004 Cheng et al. ............ 204/192.1

FOREIGN PATENT DOCUMENTS

JP      58-062829 A  *  4/1983
JP      06-215344 A  *  8/1994

OTHER PUBLICATIONS

JPO Abstract Translation of JP 06-215344-A (JPO Pat No. JP406215344A).*
JPO Abstract Translation of JP 58-062829-A (JPO Pat No. JP358062829A).*
English Translation of JP 06-215344-A (Doc ID: PTO 03-4033).*

* cited by examiner

Primary Examiner—Kevin M. Bernatz
(74) Attorney, Agent, or Firm—Morrison & Foerster LLP

(57) ABSTRACT

A novel method of manufacturing a novel recording media is disclosed. The manufacturing method includes obtaining a substrate having an inside diameter and an outside diameter and creating a radial profile of an intensive property, such as Hc, of a multilayer magnetic layer containing at least a first magnetic layer and a second magnetic layer deposited on the substrate, from the inside diameter to the outside diameter by forming a radial profile of an extensive property, such as MrT or T, of either the first magnetic layer or the second magnetic layer from the inside diameter to the outside diameter.

6 Claims, 6 Drawing Sheets

METHOD TO IMPROVE COERCIVITY RADIAL PROFILE IN MAGNETIC RECORDING MEDIA AND PRODUCT THEREOF

FIELD OF INVENTION

The present invention relates to the recording, storage and reading of magnetic data in a longitudinal magnetic media having a granular magnetic layer, particularly to a process for fabricating recording disk media having a substantially uniform coercivity in a radial direction of the disk media.

BACKGROUND

In a magnetic media, digital information (expressed as combinations of "0's" and "1's") is written on tiny magnetic bits (which themselves are made up of many even smaller grains). When a bit is written, a magnetic field produced by the disk drive's head orients the bit's magnetization in a particular direction, corresponding to either a 0 or 1. The magnetism in the head in essence "flips" the magnetization in the bit between two stable orientations.

A plot of the magnitude of magnetization or flux density as a function of applied magnetic field is called a hysteresis loop. A typical hysteresis loop is shown in FIG. 1. In this case, a magnetic field H has been applied to a sample of magnetic material, and the component of magnetization in the direction of H has been plotted. Such a loop could be directly plotted, for example, by an instrument often used in the analysis of magnetic materials called a vibrating sample magnetometer (VSM). The VSM mechanically oscillates a magnetic sample in a static magnetic field, measuring the component of M in the direction of H as H is slowly varied in magnitude.

Another common method of producing hysteresis loops is by placing the sample in a long solenoid. The solenoid creates a rapidly oscillating magnetic field H. The sample flux density is read from a small pickup loop placed near the sample. Since even without a sample, the pickup coil will pick up the field of the solenoid, two identical pickup coils are used with the sample mounted inside one of them. The signal is the difference between the output of the two coils.

In FIG. 1, starting in zero H field with a demagnetized sample, the field is gradually increased in the positive H direction. The path the magnetization initially takes, the initial magnetization curve, is 0-a-b-c. The initial slope is called the initial susceptibility $\chi_i$. If one was plotting B versus H instead of M versus H, the initial slope would be called the initial permeability. The maximum value of magnetization reached is called the saturation magnetization, Ms, where application of additional H will yield no appreciable increase in M. When the field is now reduced and reversed, the magnetization will take the path around the loop labeled c-d-e-f-c. The value of M at zero field on this major loop is called the remnant magnetization Mr. The value of H for zero magnetization on this major loop is called the coercive force or coercivity Hc. The early part of the initial magnetization curve from 0 to a is nearly linear and is reversible. The next section, from a to b, is irreversible. The final section from b to c is reversible again. These features of the hysteresis loop depend on the domain wall motion and magnetization rotation.

Ferromagnetic materials are divided into two broad classes: soft magnetic materials and hard materials. Hard magnetic materials show low initial permeability (or susceptibility) and high coercive force. FIG. 1 shows a hysteresis loop that is characteristic of a hard magnetic material that might be used for disk media or for a permanent magnet application. Soft magnetic materials exhibit high initial permeability (or susceptibility) and also low coercive force. FIG. 2 shows a hysteresis loop that is characteristic of a soft magnetic material that might be used for a transformer or a magnetic head application.

FIG. 3 shows values for permeability and coercive force for some representative magnetic materials. Supennalloy and 78 Pennalloy may be considered soft magnetic materials, and Alnico V and ferroplatinum may be considered hard magnetic materials. This figure shows a rather clear inverse relationship between penneability and coercivity. It also should be noted that both of these parameters vary over a remarkably large range-five to six orders of magnitude.

The ease of magnetization or demagnetization of a magnetic material depends on the crystal structure, grain orientation, the state of strain, and the direction of the magnetic field. The magnetization is most easily obtained along the easy axis of magnetization but most difficult along the hard axis of magnetization. A magnetic material is said to posses a magnetic anisotropy when easy and hard axes exist. On the other hand, a magnetic material is said to be isotropic when there are no easy or hard axes. A magnetic material is said to possess a uniaxial anisotropy when the easy axis is oriented along a single crystallographic direction, and to possess multiaxial anisotropy when the easy axis aligns with multiple crystallographic directions.

"Anisotropy energy" is the work against the anisotropy force to turn magnetization vector away from an easy direction. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization into the hard axis of magnetization from an easy direction, which is along a cubic body diagonal.

Important magnetic properties, such as coercivity (Hc), remnant magnetization (Mr) and coercive squareness (S*), which are crucial to the recording performance of the Co alloy thin film depend on the degree of uniformity of the composition and microstructure of the film. Particularly, in high-density recording media, an important bulk property is coercivity (Hc) besides remnant magnetization-thickness product (MrT), where Mr is the remnant magnetization and T is the film or layer thickness. (In this application, "T" refers to thickness, not temperature.) With the rapid growth in recording areal density, the uniformity of Hc throughout the disk is desired because any non-uniformity could cause degradation in the read-write performance of the finished magnetic media, which in turn could affect the product yields at both media component level, and at the finished drive product level. For further improvement of the magnetic properties, this invention proposes a novel process for fabricating novel disk media having substantially uniform Hc throughout the disk media.

SUMMARY OF THE INVENTION

This invention preferably relates a magnetic recording disk medium comprising a substrate and a multilayer magnetic layer, preferably dual layers, wherein the Hc radial profile of the dual magnetic layers is substantially uniform. Such a Hc radial profile of the dual magnetic layers could be obtained by adjusting the MrT ratio of the magnetic recording layers at different diameters of the disk medium.

One embodiment is a recording disk medium comprising a substrate with an inside diameter and an outside diameter and a multilayer magnetic layer comprising at least a first magnetic layer and a second magnetic layer deposited on the substrate, wherein the variation in MrT, a product of remnant magnetization (Mr) and thickness (T), of the multilayer magnetic layer from the inside diameter to the outside diameter is less than the variation in MrT of either the first magnetic layer or the second magnetic layer from the inside diameter to the outside diameter, and further wherein a coercivity (Hc) of the multilayer magnetic layer from the inside diameter to the outside diameter is substantially constant, wherein the variation in the Hc of the multilayer magnetic layer from the inside diameter to the outside diameter is less than 10% or wherein the variation in the MrT of the multilayer magnetic layer from the inside diameter to the outside diameter is less than 10%. Preferably, the variation in the MrT of the multilayer magnetic layer from the inside diameter to the outside diameter is less than the variation in the MrT of the first magnetic layer from the inside diameter to the outside diameter and the variation in the MrT of the multilayer magnetic layer from the inside diameter to the outside diameter is less than the variation in the MrT of the second magnetic layer from the inside diameter to the outside diameter. More preferably, the variation in the Hc of the multilayer magnetic layer from the inside diameter to the outside diameter is less than 7% and the variation in the MrT of the multilayer magnetic layer from the inside diameter to the outside diameter is less than 5%. In one variation, the Mr of each of the first and second magnetic layers from the inside diameter to the outside diameter is substantially constant. Preferably, the Mr of each of the first and second magnetic layers from the inside diameter to the outside diameter is substantially constant within the variation of less than 5%. In one variation, a thickness radial profile from the inside diameter to the outside diameter of the first magnetic layer or the second magnetic layer is either an uptrend or a downtrend as compared to a thickness radial profile from the inside diameter to the outside diameter of the multilayer magnetic layer.

Another embodiment is a method of improving a coercivity (Hc) radial profile of a disk recording medium comprising a substrate with an inside diameter and an outside diameter and a multilayer magnetic layer comprising at least a first magnetic layer and a second magnetic layer deposited on the substrate, the method comprising modifying a Hc radial profile of the multilayer magnetic layer from the inside diameter to the outside diameter by adjusting an MrT radial profile of either the first magnetic layer or the second magnetic layer from the inside diameter to the outside diameter, wherein MrT is a product of remnant magnetization (Mr) and thickness (T). Preferably, the modifying the Hc radial profile of the multilayer magnetic layer comprises adjusting the MrT radial profiles of both the first magnetic layer and the second magnetic layer. Also preferably, the modifying the Hc radial profile of the multilayer magnetic layer comprises adjusting a distance between a target and the substrate for deposition of either the first magnetic layer or the second magnetic layer. In one variation, the modifying the Hc radial profile of the multilayer magnetic layer comprises adjusting a first distance between a fist target and the substrate for deposition of the first magnetic layer and adjusting a second distance between a second target and the substrate for deposition of the second magnetic layer. Preferably, the medium is a longitudinal recording medium. More preferably, the medium is a antiferromagneticlly-coupled (AFC) recording medium.

Another embodiment is a method of manufacturing a disk recording medium comprising a substrate with an inside diameter and an outside diameter and a multilayer magnetic layer comprising at least a first magnetic layer and a second magnetic layer deposited on the substrate, the method comprising obtaining the substrate and creating a radial profile of an intensive property of the multilayer magnetic layer from the inside diameter to the outside diameter by forming a radial profile of an extensive property of either the first magnetic layer or the second magnetic layer from the inside diameter to the outside diameter. Preferably, the creating the radial profile of an intensive property of the multilayer magnetic layer from the inside diameter to the outside diameter comprises forming a radial profile of an extensive property of both the first magnetic layer and the second magnetic layer from the inside diameter to the outside diameter. More preferably, the intensive property is coercivity (Hc) and the extensive property is MrT, a product of remnant magnetization (Mr) and thickness (T). In one variation, the intensive property is Hc and the extensive property is T.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
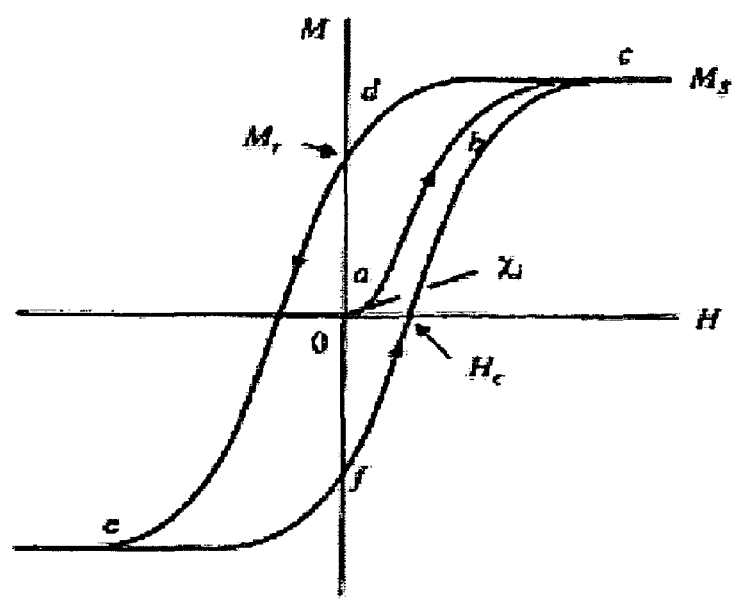
FIG. 1 shows a hysteresis loop of a magnetic material.
Figure 2:
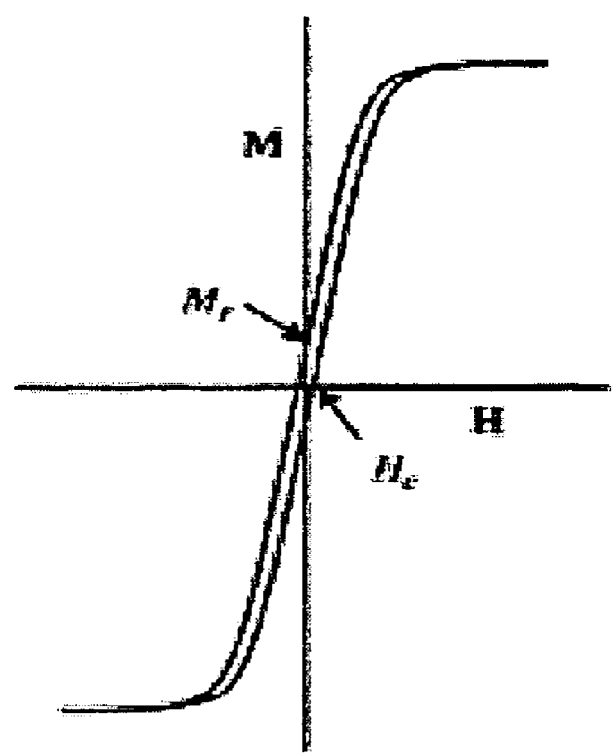
FIG. 2 shows a hysteresis loop of a soft magnetic material.
Figure 3:
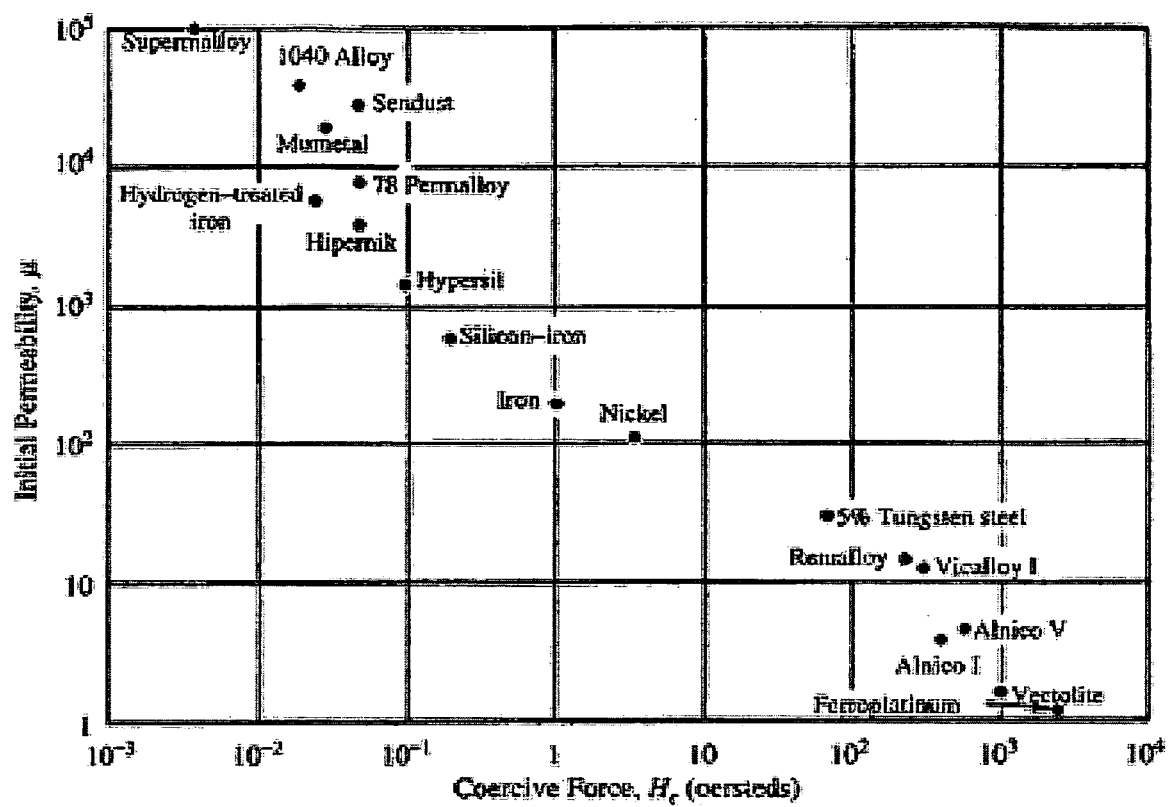
FIG. 3 shows initial permeability and coercive force (coercivity) for representative materials.

Mr is relatively stable within a particular disk medium. Thus, to improve MrT uniformity one could improve the physical thickness uniformity of the magnetic layer of the disk medium. However, Hc variations are difficult to control because they are not only related to the thickness but also the microstructure of material. For an extreme case, a given magnetic material could have a Hc of several thousand oersteds(Oe) in a state of thin film, while only a few Oe in a bulk state because of the thickness and microstructure variations in the two states. This Hc non-uniformity in the radial direction is high in the prior art media. This invention provides a method of manufacturing for producing dual layers of magnetic material(s) having substantially uniform Hc in the radial direction of the disk media such that the Hc non-uniformity in the radial direction of the multilayer magnetic layer would be preferably 10% or less.

Almost all the manufacturing of the disk media would take place in clean rooms where the amount of dust in the atmosphere is kept very low, and is strictly controlled and monitored. After one or more cleaning and texturing processes on a non-magnetic substrate, the substrate would have an ultra-clean surface and would be ready for the deposition of layers of magnetic media on the substrate.

Each of the layers constituting magnetic recording media of the present invention, except for a lubricant topcoat layer (if applied), may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping of the medium into a bath containing a solution of the lubricant compound, followed by removal of excess liquid, as by wiping, or by a vapor lube deposition method.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

A pass-by sputtering apparatus for manufacturing magnetic recording media in accordance with the embodiments of the present invention is could comprise an in-line deposition system in which disk substrates travel sequentially through the deposition stations. The disks pass through stations for underlayer deposition, fist interlayer deposition, protective layer deposition, second interlayer deposition and magnetic layer deposition. The disks are then passed to the protective carbon overcoat deposition station. Other embodiments would require variations to the in-line process using well-known processing techniques or structures that are not described herein.

Sputtering leads to some particulates formation on the post sputter disks. These particulates need to be removed to ensure that they do not lead to the scratching between the head and substrate. Thus, a lube is preferably applied to the substrate surface as one of the topcoat layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk could be prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

The signal voltage produced by the magnetic media is proportional to MrT, which contains all the media parameters. For example, in the case of a particulate media, the particles of the magnetic material are relatively apart and have low Mr; hence, such a media would require a large film thickness of the magnetic layer to produce a high MrT. On the other hand, a film using materials in which approximately 100% of the material is magnetic can give adequate signal voltage with even a thin film because the MrT of such a film can be sufficiently large.

This invention utilizes a novel process to improve Hc radial uniformity of a multilayer magnetic layer by adjusting the MrT of the magnetic recording layers at individual diameter from the inside diameter to the outside diameter of a disk medium. While the exact mechanism for the improvements observed by the media of this invention is not well understood, arguably, the improved performance of the media of this invention could be due to microstructure changes resulting from the novel process conditions for forming the media with a multilayer magnetic layer.

When referring to magnetic recording media, there are two basic types: oriented and isotropic. Isotropic media has the magnetic layer and under-layers, which are used to control the crystallographic orientation of the magnetic layer, applied to a non-preferentially polished substrate. Oriented media has a scratch pattern or texture on the disk surface. The texture improves magnetic orientation and enhances film performance by initiating grain growth. Also, the texture causes magnetic properties in down-track and cross-track directions to be different, which could greatly increase media signal-to-noise ratio, thereby greatly improving media performance and density. To texture the surface of a glass substrate, seedlayer materials such as a nickel phosphorus layer is applied, which is then textured. The recording media of this invention could be oriented or isotropic. The substrate could be a glass substrate or aluminum substrate, preferably with a NiP coating.

Figure 4:
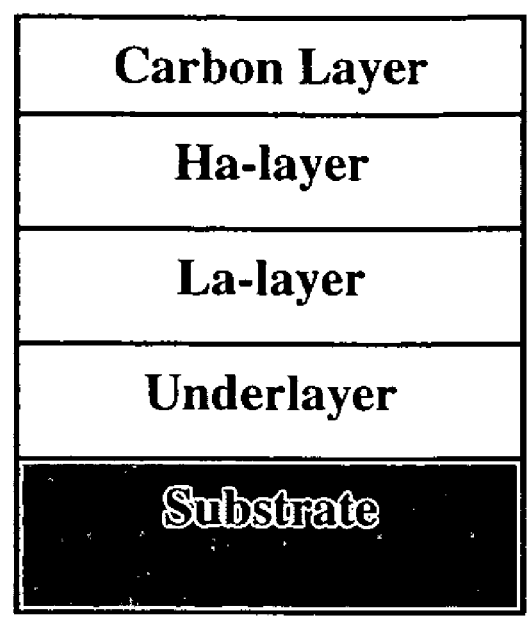
FIG. 4 shows a schematic diagram of the layer structure of an embodiment of media of the invention.

FIG. 4 shows a simplified cross-sectional view of an embodiment of a disk medium of this invention. The film structure of the magnetic media of the example could have one low anisotropy magnetic layer (La-layer) and one high anisotropy magnetic layer (Ha-layer) with the MrT substantially the same in both layers at some diameter of the disk media, e.g., the MrT ratio of the two layers could be about 50:50 at the inner diameter of the disk. The La-layer could have a lower Hc and the Ha-layer could have a higher Hc if they both have substantially the same thickness and microstructure. Preferably, the La-layer and the Ha-layer are the only layers that contribute to the MrT of the multilayer magnetic layer formed by the dual magnetic layers.

The MrT radial profiles of the layer could be flat from the inner diameter (ID) to the outer diameter (OD) through the middle diameter (MD). The MrT radial profile of the dual magnetic layers according to this invention could also be flat because MrT is an extensive quantity and possesses the summable attribute. It was however recognized by the applicants that the Hc of the dual magnetic layers is not equal to the sum of the Hc of the La-layer and the Hc of the Ha-layer at individual points along the diameter because Hc is a intensive quantity. It was also recognized by the applicants that no matter whether or not the Hc radial profiles of the La-layer and the Ha-layer were flat, the Hc radial profile of the dual magnetic layers was usually not flat. Instead, the Hc radial profile of the dual magnetic layers either had an uptrend or a downtrend from the ID to the OD through the MD, as shown in the row entitled "Original" of Table I. The exact mechanism for this anomalous behavior of the Hc radial profile does not appear to have been recognized by others and has not been well understood.

The applicants thus undertook an objective among others of creating a flat Hc radial profile of a multilayer magnetic layer having least two magnetic layers. The inventors found that when the dual magnetic layers had a downward trend in the Hc, one way to create the Hc radial profile of the dual magnetic layers flat was to change the MrT radial profile of the La-layer from a flat profile to a downtrend profile of and to change the MrT radial profile of the Ha-layer from a flat profile to an uptrend profile. On the other hand, when the dual magnetic layers had a upward trend in the Hc, one way to create the Hc radial profile of the dual magnetic layers flat was to change the MrT radial profile of the La-layer from a flat profile to an uptrend profile of and to change the MrT radial profile of the Ha-layer from a flat profile to a downtrend profile. These radial profiles of MrT and Hc of some embodiments of the invention are shown in the row entitled "Modified" of Table I.

TABLE I

The radial profile of MrT and Hc

| Profile | MrT profile | | Hc profile |
|---|---|---|---|
| Layer | La layer | Ha layer | Two layers | Two layers |
| original | flat (id, md, od) | flat (id, md, od) | flat (id, md, od) | downtrend (id→od) |
|  |  |  |  | uptrend (id→od) |
| Modified | downtrend-up (V-shape) | uptrend-down (∧-shape) | flat | flat |
|  | uptrend-down (∧-shape) | downtrend-up (V-shape) | flat | flat |

The concept of this invention is to change the radial profiles of MrT of the individual layers (such as the La-layer and the Ha-layer) from flat to non-flat to make the radial profile of Hc of the dual magnetic layers flat. As would be quite apparent to one of ordinary skill in the art of recording medium, this idea would have been totally counterintuitive persons to ordinary skill in this art. In the past, persons of ordinary skill in this art attempted to make the radial profiles of MrT of the individual layers (such as the La-layer and the Ha-layer) as flat as possible in an attempt to make the radial profile of Hc of the multilayer magnetic layer flat.

Figure 5:
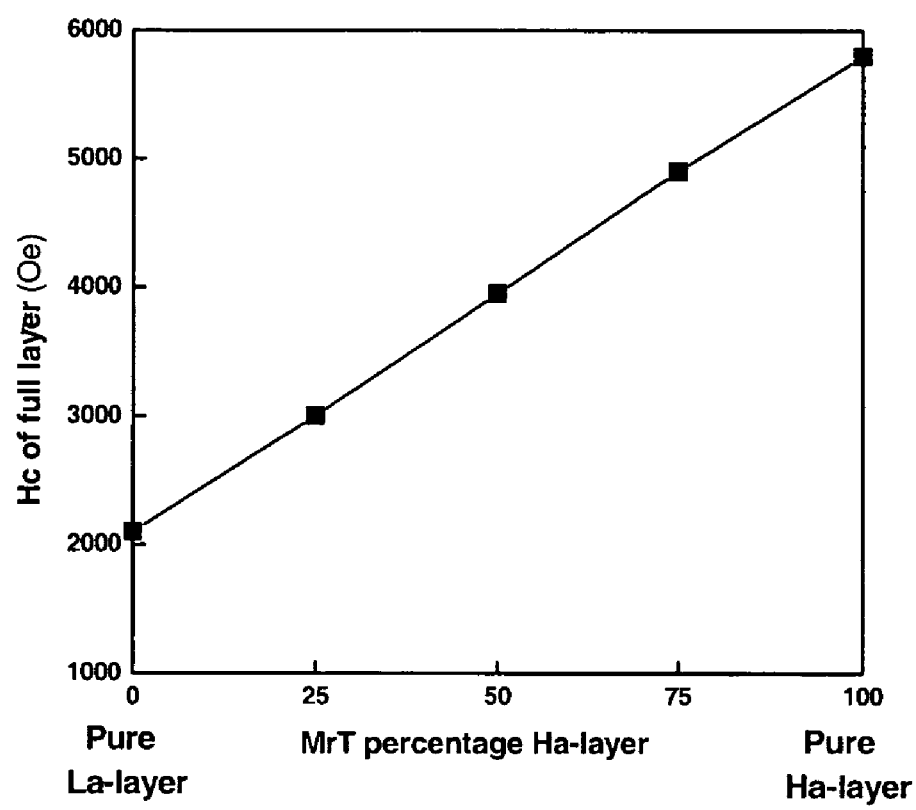
FIG. 5 shows Hc of dual layers as a function of MrT percentage of La-layer and Ha-layer.

The applicants believe that the Hc of the dual magnetic layers is a function of MrT ratio of La-layer and Ha-layer as shown in FIG. 5. The La-layer has a lower Hc and the Ha-layer has a higher Hc. For the dual magnetic layers having a Hc downtrend case, keeping the ID MrT ratio the same to reduce the MrT at MD and OD of the La-layer and increase the MrT at MD and OD of Ha-layer appears to increase the relative MrT percentage of the Ha-layer in the dual magnetic layers, resulting in an increase in the Hc at MD and OD of dual layers and thereby creating a flat Hc profile of the dual magnetic layers. For the dual magnetic layers having a Hc uptrend case, keeping the ID MrT ratio the same to increase the MrT at MD and OD of the La-layer and reduce the MrT at MD and OD of the Ha-layer appears to reduce the relative MrT percentage of the Ha-layer in the dual magnetic layers, resulting in a reduced in Hc at MD and OD of the dual magnetic layers and thereby creating a flat Hc profile of the dual magnetic layers. On the other hand, the Mrt changes at MD and OD appear to compensate each other, and therefore the Mrt radial profile of dual layers is still substantially flat after the modifications according to this invention.

Figure 6:
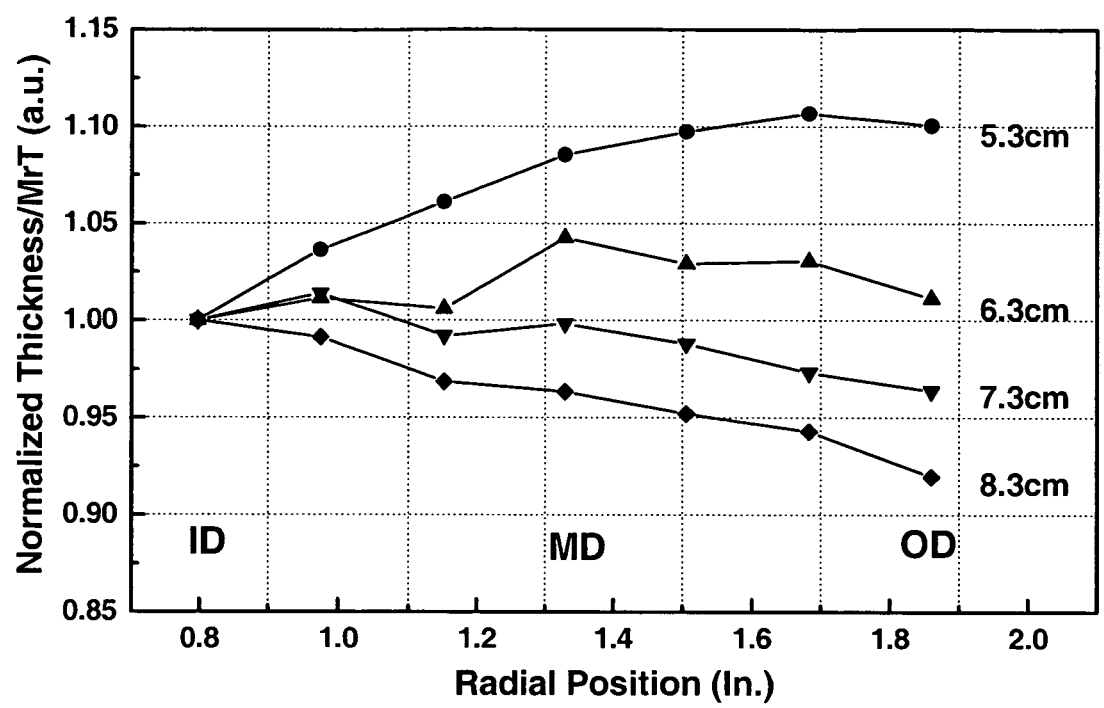
FIG. 6 shows the thickness radial profile of a layer as a function of target-to-substrate distance.

It was also recognized that Mr within a disk is substantially stable or could be considered as a constant. Thus, a change in an MrT radial profile could be achieved by a change in the thickness radial profile of the layer. For manufacturing high-density magnetic recording media, magnetron sputtering is a preferred method. FIG. 6 shows the thickness profile as a function of target-to-substrate distance. The data of FIG. 6 was obtained by a Monte Carlo simulation on a 7-inch target by using a Monte Carlo simulation software. Persons of ordinary skill in this art would recognize that the correlation between the results obtained by the Monte Carlo simulation and those obtained by performing sputtering experiments is good. Thus, the data of FIG. 6 could be replicated by experiments without difficulty by persons of ordinary skill in this art. It was found that as the target-to-substrate distance increases, the thickness radial profile evolves from uptrend, to flat and downtrend. Therefore, one could increase the MrT at MD and OD by reducing the target-to-substrate distance and reduce the MrT at MD and OD by increasing the target-to-substrate distance.

Thus, depending on the requirements of magnetic media, to achieve a desired Hc radial profile of media, one could change the target-to-substrate distance either in La-layer sputter station or in Ha-layer sputter station or both.

In a preferred embodiment, the thickness of the seedlayer is about 20 Å to about 2000 Å, the thickness of the underlayer is about 10 Å to about 1000 Å, and the thickness of the first or second magnetic layer is about 40 Å to about 300 Å. In another preferred embodiment, there could be an adhesion layer between the seedlayer and the substate, the thickness of the adhesion layer being about 3 Å to about 1000 Å, the thickness of the seedlayer being about 20 Å to about 2000 Å, the thickness of the underlayer being about 10 Å to about 1000 Å, and the thickness of the first or second magnetic layer is about 40 Å to about 300 Å.

In another preferred embodiment, the thickness of the adhesion layer, if present, is 3 Å to about 250 Å, preferably between 5 Å and 150 Å, and most preferably about 20 Å. In a preferred embodiment, the thickness of the seedlayer is 20 Å to about 1600 Å, preferably between 40 Å and 1200 Å. In a preferred embodiment, the thickness of the underlayer is 12 Å to about 500. A, preferably between 15 Å and 250 Å, and most preferably about 25 Å. In a preferred embodiment, the thickness of the first or second magnetic layer is 55 Å to about 250 Å, preferably between 80 Å and 225 Å, and most preferably about 170 Å. In a preferred embodiment, the thickness of the protective carbon layer is 10 Å to about 300 Å, preferably between 20 Å and 60 Å, and most preferably about 30 Å. The protective layer is made of hydrogenated carbon ($CH_x$).

The magnetic recording medium has a remnant coercivity of about 2000 to about 10,000 Oersted, and an Mrt (product of remanance, Mr, and magnetic layer thickness, t) of about 0.15 to about 2.0 memu/cm$^2$. In a preferred embodiment, the coercivity is about 2500 to about 9000 Oersted, more preferably in the range of about 3000 to about 6000 Oersted, and most preferably in the range of about 3500 to about 5000 Oersted. In a preferred embodiment, the $M_r t$ is about 0.2 to about 1 memu/cm$^2$, more preferably in the range of about 0.25 to about 0.45 memu/cm$^2$, and most preferably in the range of about 0.27 to about 0.4 memu/cm$^2$.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A recording disk medium comprising a substrate with an inside diameter and an outside diameter and a multilayer magnetic layer comprising at least a first magnetic layer and a second magnetic layer deposited on the substrate, wherein the variation in MrT, a product of remnant magnetization (Mr) and thickness (T), of the multilayer magnetic layer from the inside diameter to the outside diameter is less than the variation in MrT of either the first magnetic layer or the second magnetic layer from the inside diameter to the outside diameter, and further wherein a coercivity (Hc) of the multilayer magnetic layer from the inside diameter to the outside diameter is substantially constant such that a variation in the Hc of the multilayer magnetic layer from the inside diameter to the outside diameter is less than 10%.

2. The medium of claim 1, wherein the variation in the MrT of the multilayer magnetic layer from the inside diameter to the outside diameter is less than 10%.

3. The medium of claim 2, wherein the variation in the Hc of the multilayer magnetic layer from the inside diameter to the outside diameter is less than 7% and the variation in the MrT of the multilayer magnetic layer from the inside diameter to the outside diameter is less than 5%.

4. The medium of claim 1, wherein the variation in the MrT of the multilayer magnetic layer from the inside diameter to the outside diameter is less than the variation in the MrT of the first magnetic layer from the inside diameter to the outside diameter and the variation in the MrT of the multilayer magnetic layer from the inside diameter to the outside diameter is less than the variation in the MrT of the second magnetic layer from the inside diameter to the outside diameter.

5. The medium of claim 1, wherein the Mr of each of the first and second magnetic layers from the inside diameter to the outside diameter is substantially constant within the variation of less than 5%.

6. The medium of claim 1, wherein a thickness radial profile from the inside diameter to the outside diameter of the first magnetic layer or the second magnetic layer is either an uptrend or a downtrend as compared to a thickness radial profile from the inside diameter to the outside diameter of the multilayer magnetic layer.

* * * * *